(12) United States Patent
Kim

(10) Patent No.: US 12,435,925 B2
(45) Date of Patent: Oct. 7, 2025

(54) ELECTRODE DRYING DEVICE EQUIPPED WITH WATER SUPPLY PART, AND METHOD FOR DRYING ELECTRODE USING SAME

(71) Applicant: LG ENERGY SOLUTION, LTD., Seoul (KR)

(72) Inventor: Kyoung Ho Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 921 days.

(21) Appl. No.: 17/631,663

(22) PCT Filed: Jul. 15, 2020

(86) PCT No.: PCT/KR2020/009337
§ 371 (c)(1),
(2) Date: Jan. 31, 2022

(87) PCT Pub. No.: WO2021/020774
PCT Pub. Date: Feb. 4, 2021

(65) Prior Publication Data
US 2022/0276001 A1 Sep. 1, 2022

(30) Foreign Application Priority Data
Aug. 1, 2019 (KR) .......................... 10-2019-0093890

(51) Int. Cl.
*F26B 21/00* (2006.01)
*F26B 3/04* (2006.01)
(Continued)

(52) U.S. Cl.
CPC ............. *F26B 21/005* (2013.01); *F26B 3/04* (2013.01); *F26B 3/12* (2013.01); *F26B 13/104* (2013.01);
(Continued)

(58) Field of Classification Search
CPC ........ F26B 21/005; F26B 21/08; F26B 21/10; F26B 3/04; F26B 3/12; F26B 13/104;
(Continued)

(56) References Cited

U.S. PATENT DOCUMENTS 9,834,882 B2 * 12/2017 Patil ..................... D06F 58/206
2003/0226576 A1 * 12/2003 Gray ......................... B08B 3/12
134/1
(Continued)

FOREIGN PATENT DOCUMENTS

CN 192110803 B 9/2012
CN 102072320 B 12/2012
(Continued)

OTHER PUBLICATIONS

International Search Report (PCT/ISA/210) issued in PCT/KR2020/009337, dated Oct. 15, 2020.
(Continued)

*Primary Examiner* — Michael G Hoang
*Assistant Examiner* — Bao D Nguyen
(74) *Attorney, Agent, or Firm* — Birch, Stewart, Kolasch & Birch, LLP

(57) ABSTRACT

Provided is an electrode drying apparatus including a moisture supply unit capable of setting the internal temperature of a drying oven to a reference value, which is a level at which the drying of an electrode to be dried is stabilized, before an electrode drying process using hot air is started, thereby preventing the electrode from being fractured by over-drying at the early stage of drying the electrode in the drying oven, and an electrode drying method using the same.

16 Claims, 4 Drawing Sheets

(51) Int. Cl.
*F26B 3/12* (2006.01)
*F26B 13/12* (2006.01)
*F26B 13/20* (2006.01)
*F26B 15/12* (2006.01)
*F26B 21/08* (2006.01)
*F26B 21/10* (2006.01)

(52) U.S. Cl.
CPC .............. *F26B 13/12* (2013.01); *F26B 15/12* (2013.01); *F26B 21/08* (2013.01); *F26B 21/10* (2013.01)

(58) Field of Classification Search
CPC .......... F26B 13/12; F26B 15/12; F26B 13/10; F26B 21/004; F26B 21/001; F26B 3/02; H01M 4/139; H01M 4/0471; H01M 4/404; H01M 10/058
See application file for complete search history.

(56) References Cited

U.S. PATENT DOCUMENTS

| | | | |
|---|---|---|---|
| 2009/0260256 A1* | 10/2009 | Beaulac | D06F 58/38 |
| | | | 34/108 |
| 2015/0168060 A1* | 6/2015 | Kim | D06F 58/44 |
| | | | 34/543 |
| 2015/0255780 A1 | 9/2015 | Tsuchiya | |
| 2016/0079634 A1 | 3/2016 | Onodera et al. | |
| 2017/0276429 A1* | 9/2017 | Heo | F26B 21/14 |

FOREIGN PATENT DOCUMENTS

| | | | |
|---|---|---|---|
| CN | 193185858 A | | 6/2013 |
| CN | 109971894 A * | | 7/2019 |
| JP | 2010-67579 A | | 3/2010 |
| JP | 2011-80718 A | | 4/2011 |
| JP | 2011080718 A * | | 4/2011 |
| JP | 2013064516 A * | | 4/2013 .............. F26B 13/10 |
| JP | 2014-1914 A | | 1/2014 |
| KR | 10-1550487 B1 | | 9/2015 |
| KR | 10-2015-0131563 A | | 11/2015 |
| KR | 10-1735034 B1 | | 5/2017 |
| KR | 10-2017-0109912 A | | 10/2017 |
| KR | 10-1867659 B1 | | 6/2018 |
| KR | 10-2018-0079841 A | | 7/2018 |
| WO | WO 2013/038005 A1 | | 3/2013 |

OTHER PUBLICATIONS

Extended European Search Report for European Applicantion No. 20847966.7, dated Jun. 10, 2022.

* cited by examiner

[FIG. 1]
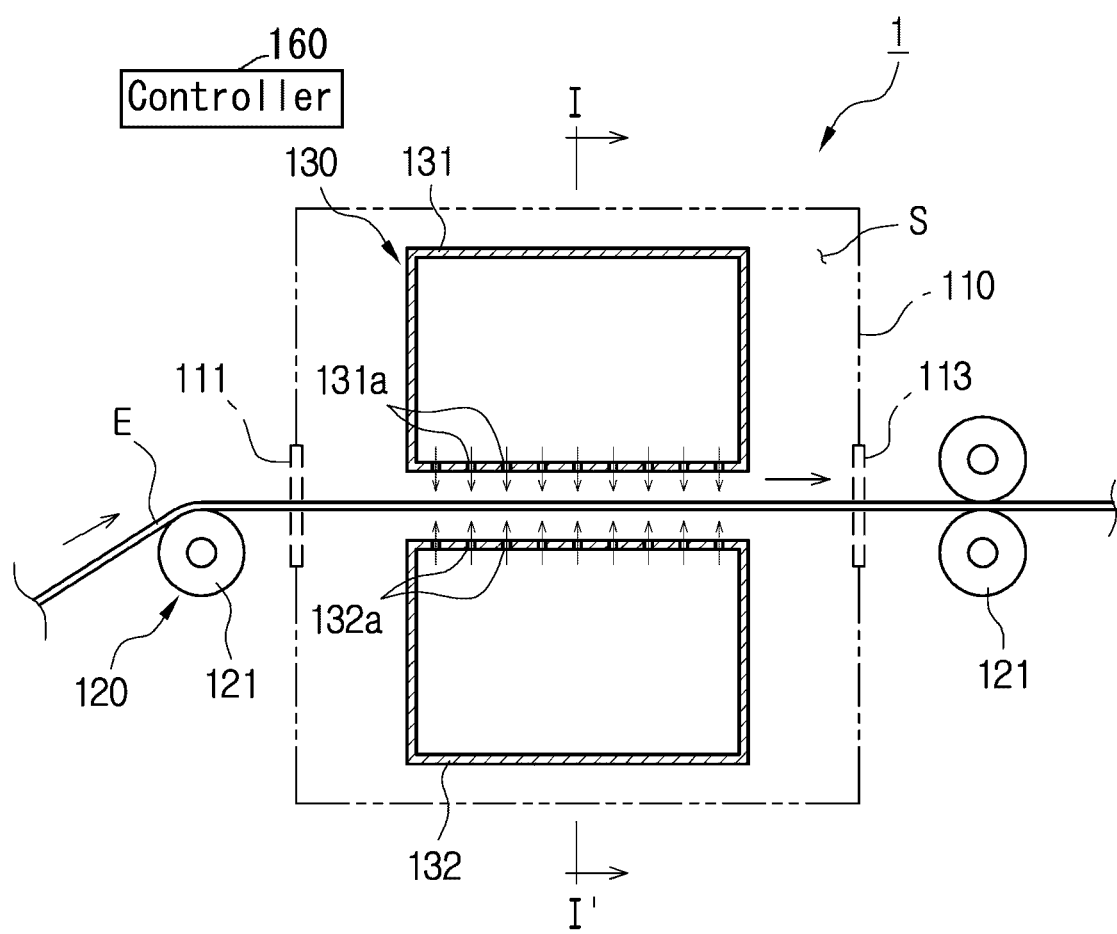

[FIG. 2]
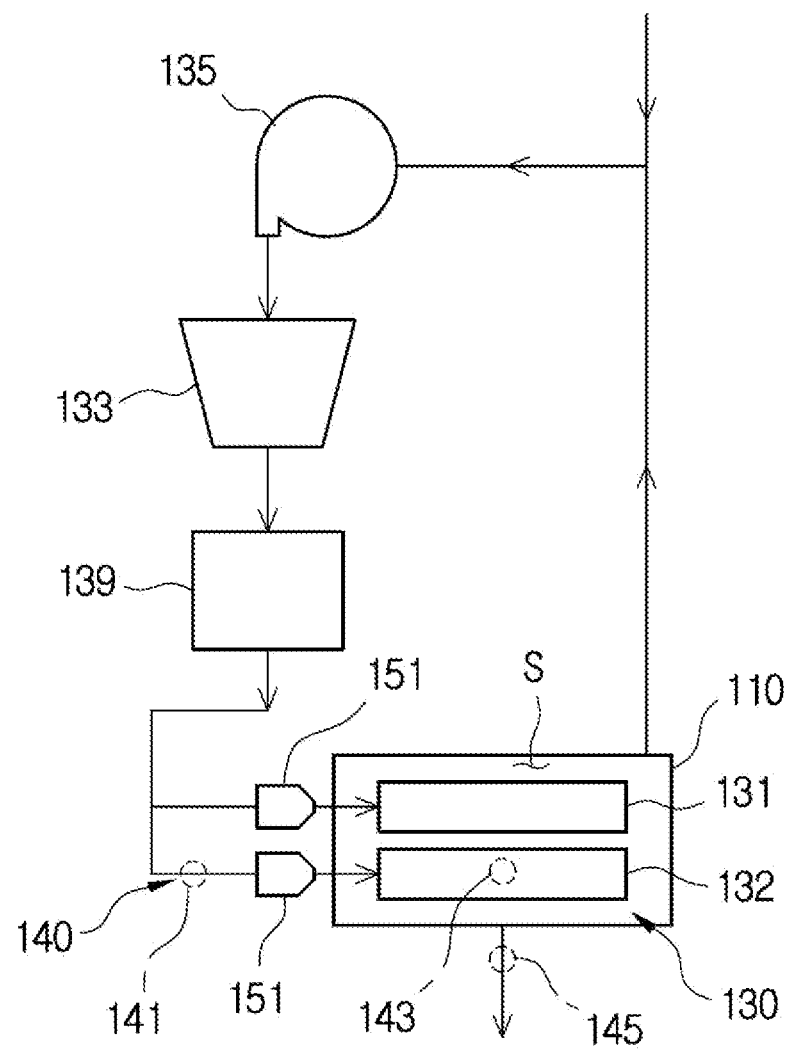

[FIG. 3]
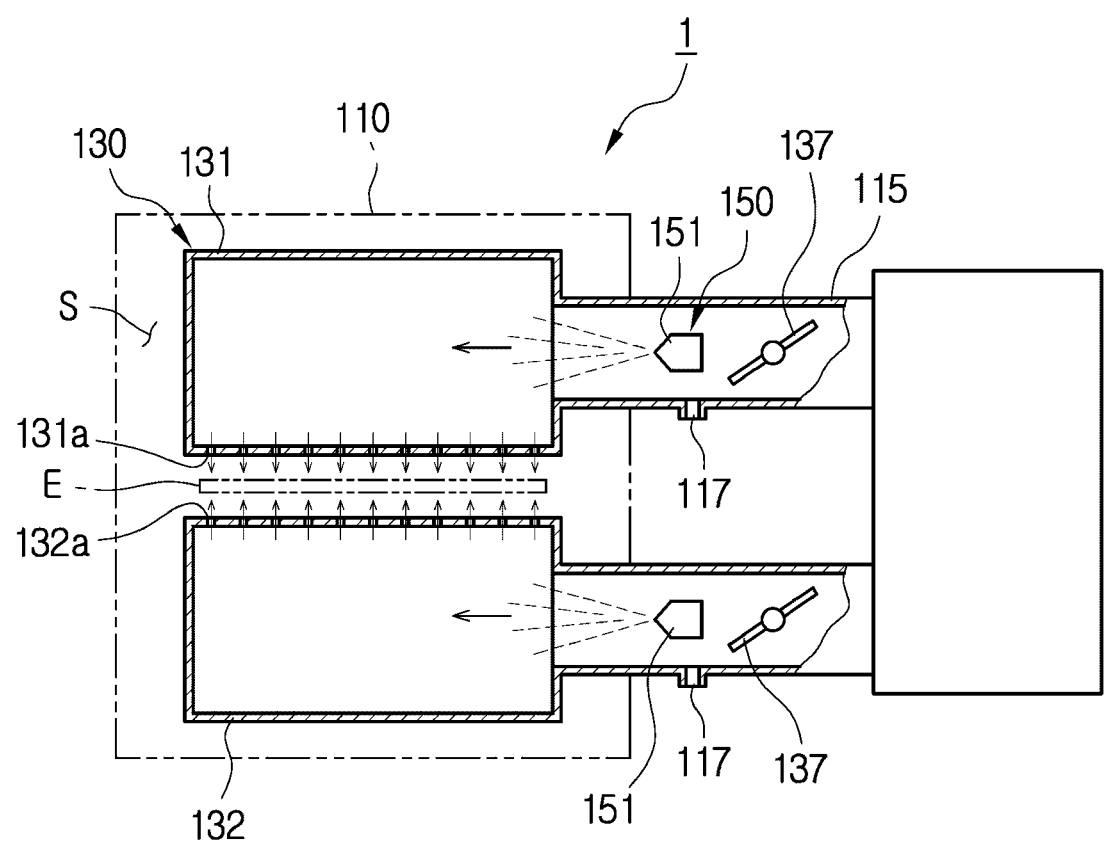

[FIG. 4]
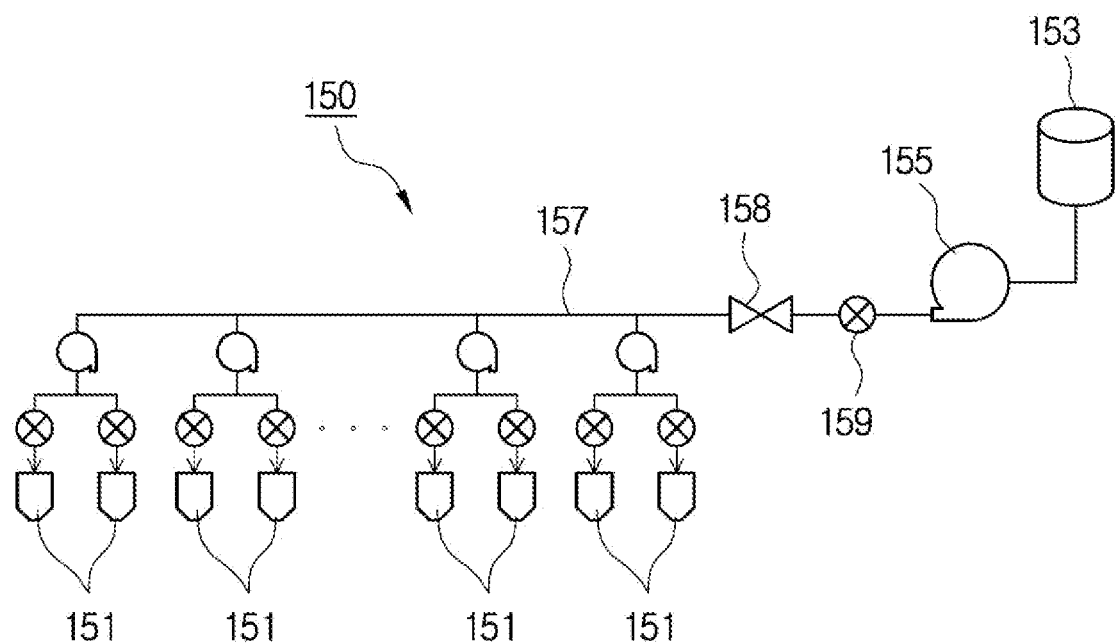

ELECTRODE DRYING DEVICE EQUIPPED WITH WATER SUPPLY PART, AND METHOD FOR DRYING ELECTRODE USING SAME

TECHNICAL FIELD

The Present invention claims the benefit of the filing date of Korean Patent Application No. 10-2019-0093890, filed on Aug. 1, 2019, in the Korean Intellectual Property Office, the entire content of which is included in the present invention. The present invention relates to an electrode drying apparatus and an electrode drying method using the same and, more particularly, to an electrode drying apparatus including a moisture supply unit able to stabilize the internal temperature of a drying oven when drying an electrode using hot air and an electrode drying method using the same.

BACKGROUND ART

In general, lithium (Li) secondary cells respectively include a cathode, an anode, and an electrolyte interposed between the anode and the cathode. Li secondary cells are divided into Li ion cells, Li polymer cells, and the like, depending on which one of a cathode active material and an anode active material is used.

In this case, electrodes of such an Li secondary cell may respectively be formed by coating a current collector, such as a sheet, a mesh, a film, or foil, made of aluminum (Al) or copper (Cu), with a cathode or anode active material, followed by drying in a drying oven. A patent application for such a drying process was previously filed as Korean Patent Application Publication No. 10-2012-0057437 (published on Jun. 5, 2012).

In addition, recently, the speed of production of electrodes is increasing, and the temperature of hot air used in the drying of coating is rising in response to the high-capacity and high-loading of electrodes.

Thus, when an electrode to be dried is dried, the internal temperature of the drying oven is lowered due to evaporation heat of a solvent. Due to the resultant heat loss, after the interior of the oven is thermally stabilized, the temperature of hot air discharged from a hot air nozzle is lower than a set temperature by an average of 5° C. to 10° C.

That is, when the set temperature of the hot air supplied into the oven is about 150° C., the actual temperature of the hot air supplied into the oven after the interior of the oven is thermally stabilized by evaporation heat of the solvent may range from 140° C. to 145° C.

In this case, electrode drying conditions in the case of mass production are determined on the basis of a state in which the interior of the oven is sufficiently stabilized in terms of drying performance. Such a difference between the temperatures before and after the temperature of the oven is stabilized increases with increases in the amount of the drying solvent.

The high-speed and high-loading production of electrodes increases the amount of the drying solvent, and also increases the difference between the temperatures before and after the stabilization of the drying oven at the early stage. Thus, at the early stage of drying the electrode under predetermined drying conditions after the interior of the drying oven is stabilized, the electrodes may have problems, such as peeling or cracking, caused by over-drying. These problems may cause a decrease in productivity and disconnection during operation of the electrodes, and thus, an improvement is required.

DISCLOSURE

Technical Problem

The present invention has been made to solve the above problems, and an object of the present invention is to propose an electrode drying apparatus including a moisture supply unit capable of setting the internal temperature of a drying oven to a reference value, which is a level at which the drying of an electrode to be dried is stabilized, before an electrode drying process using hot air is started, thereby preventing the electrode from being fractured by over-drying at the early stage of drying the electrode in the drying oven, and an electrode drying method using the same.

Technical Solution

As an embodiment of the present invention, provided is an electrode drying apparatus including: a body including an internal accommodation space provided for a drying process, an inlet, and an outlet; a transportation unit configured to transport an electrode to be dried in a single direction so that the electrode to be dried passes through the accommodation space through the inlet and the outlet; a hot air supply unit configured to blow hot air toward the electrode transported by the transportation unit so as to dry the electrode to be dried; a temperature measuring unit configured to measure an internal temperature of the accommodation space; a moisture supply unit configured to supply moisture into the accommodation space before the electrode to be dried passes through the accommodation space, so that the internal temperature of the accommodation space is lowered to a predetermined reference value by evaporation of the supplied moisture and is stabilized; and a controller configured to control the entire elements disposed within the body.

In this case, the hot air supply unit may include: a heat exchanger configured to heat external air supplied thereto; and a blower fan configured to supply the external air heated by the heat exchanger into the accommodation space.

In addition, the hot air supply unit may further include a damper disposed within a duct that communicates with an interior of the accommodation space and configured to adjust an amount of the hot air supplied into the accommodation space.

In addition, the moisture supply unit may include a moisture spray nozzle disposed within the duct and configured to supply moisture in form of mist so that the moisture is contained in and supplied together with the hot air supplied into the accommodation space.

In addition, a bottom of the duct may include a drain hole, the drain hole being configured to discharge water outwards when the water leaks from the moisture supply unit.

In addition, the moisture supply unit may include: a storage tank configured to store deionized (DI) water; a supply line, and a supply pump configured to supply the DI water stored in the storage tank to the moisture spray nozzle through the supply line.

In addition, a plurality of the electrode drying apparatuses may be spaced apart from each other in parallel. Each of the plurality of electrode drying apparatuses includes a storage tank configured to store deionized (DI) water; and a supply pump configured to supply the DI water stored in the storage tank to the moisture spray nozzle through a supply line. The DI water stored in the storage tank may be supplied to each of the plurality of electrode drying apparatuses through the supply line.

In addition, an on-off valve and a flow meter may be disposed on the supply line connected to the electrode drying apparatus, such that the controller monitors and controls, in real time, a total amount of the ultrapure water supplied to the electrode drying apparatus using the on-off valve and the flow meter.

In addition, the temperature measuring unit may include: a first sensor configured to measure the temperature of the hot air supplied by the hot air supply unit; a second sensor configured to monitor the internal temperature of the accommodation space in real time; and a third sensor configured to measure the temperature of air discharged from the accommodation space.

In addition, when the temperature measured by the third sensor is equal to or higher than a reference value, the controller may control the moisture supply unit to supply the moisture into the accommodation space so that the internal temperature of the accommodation space reaches the reference value.

In addition, provided is an electrode drying method including: measuring an internal temperature of an accommodation space before introducing an electrode to be dried into the accommodation space of an electrode drying apparatus; when the measured internal temperature of the accommodation space is equal to or higher than a reference value, which is a level at which drying of the electrode to be dried is stabilized, spraying, by a moisture supply unit, moisture into the accommodation space to cool the accommodation space; determining, by a controller, whether or not the internal temperature of the accommodation space has reached the reference value by evaporation heat of the moisture supplied into the accommodation space; and when the internal temperature of the accommodation space has reached the reference value, stopping the supplying of the moisture into the accommodation space and performing a drying process by allowing the electrode to be dried to move through the accommodation space.

In this case, the moisture supply unit may allow the moisture to be contained in and supplied together with the hot air supplied into the accommodation space.

The controller may adjust an amount of the moisture sprayed by the moisture supply unit by comparing a measured temperature of air discharged through the accommodation space with the reference value.

Advantageous Effects

The present invention having the above-described configuration may measure the internal temperature of the accommodation space before inputting the electrode to be dried into the accommodation space of the electrode drying apparatus, determine whether or not the measured internal temperature of the accommodation space is a level at which the drying of the electrode to be dried is stabilized, and when the measured internal temperature of the accommodation space is equal to or higher than the reference value, and spray moisture into the accommodation space using the moisture supply unit so as to cool the accommodation space to a temperature corresponding to the level of the reference value.

Accordingly, the level at which the drying of the electrode to be dried is stabilized may be maintained, thereby preventing the electrode to be dried from being peeled or cracked by over-drying of the electrode at the early stage of the drying process.

BRIEF DESCRIPTION OF DRAWINGS

FIG. 1 is a side view illustrating the internal configuration of an electrode drying apparatus according to the present invention;

FIG. 2 is a schematic configuration view illustrating a hot air supply unit and a temperature measuring unit according to the present invention;

FIG. 3 is a cross-sectional view taken along line I-I' in FIG. 1; and

FIG. 4 is a schematic view illustrating a structure in which a moisture supply unit is connected to the electrode drying apparatus according to the present invention.

Description of the Reference Numerals in the Drawings

| | |
|---|---|
| 1: electrode drying apparatus | |
| E: electrode to be dried | |
| 110: body | S: accommodation space |
| 111: inlet | 113: outlet |
| 115: duct | 117: drain hole |
| 120: transportation unit | 121: transportation roller |
| 130: hot air supply unit | 131: upper trunk |
| 132: lower trunk | 133: heat exchanger |
| 135: blower fan | 137: damper |
| 140: temperature measuring unit | |
| 141: first sensor | |
| 143: second sensor | 145: third sensor |
| 150: moisture supply unit | 151: moisture spray nozzle |
| 153: storage tank | 155: supply pump |
| 157: supply line | 158: on-off valve |
| 159: flow meter | 160: controller |

MODE FOR INVENTION

Hereinafter, configurations and operations of specific embodiments of the present invention will be described in detail with reference to the accompanying drawings.

Herein, in designating elements of the drawings by reference numerals, the same elements will be designated by the same reference numerals, if possible, although they are shown in different drawings.

FIG. 1 is a side view illustrating the overall configuration of an electrode drying apparatus according to the present invention.

Referring to FIG. 1, an electrode drying apparatus 1 according to an embodiment of the present invention may include a body 110, a transportation unit 120, a hot air supply unit 130, a temperature measuring unit 140, a moisture supply unit 150, a controller 160.

The configuration of the present invention will be described in details as follows.

First, the body 110 forms a main frame of the electrode drying apparatus 1, and has an internal accommodation space S provided for a drying process. In addition, an inlet 111 through which an electrode E to be dried is introduced may be provided on one side of the body 110, while an outlet 113 through which the electrode E that has undergone the drying process is discharged may be provided on the other side of the body 110.

The transportation unit 120 may be configured to transport the electrode E to be dried in a single direction so that the electrode passes through the accommodation space S, serving as a drying oven, through the inlet 111 and the outlet 113.

Specifically, the transportation unit 120 may transport the electrode E to be dried in one direction using a plurality of transportation rollers 121 rotating in one direction by power received from a motor (not shown). This configuration of the transportation unit 120 is typically applied and used in an electrodes fabricating process, and a detailed description thereof will be omitted herein.

The hot air supply unit 130 serves to dry the electrode E to be dried by blowing hot air toward the electrode E to be dried transported by the transportation unit 120.

Specifically, the hot air supply unit 130 may include an upper trunk 131 having a hot air supply passage provided therein and a lower trunk 132 spaced apart from the upper trunk 131 such that the electrode E to be dried is transported in one direction between the upper trunk 131 and the lower trunk 132. Discharge holes 131a and 132a able to supply the hot air toward the electrode E to be dried may be formed through portions of the upper trunk 131 and the lower trunk 132 that face each other.

Referring to FIGS. 2 and 3, a heat exchanger 133 heating external air supplied thereto and a blower fan 135 supplying the external air heated by the heat exchanger 133 into the accommodation space S may be connected to each of the upper trunk 131 and the lower trunk 132. Reference numeral 139, which has not been described, indicates a high-efficiency particulate air (HEPA) filter removing particles in the supplied hot air.

In this case, the hot air supplied into the accommodation space S of the body 110 is used for drying the electrode E to be dried. Afterwards, a portion of the hot air circulates, while the remaining portion of the hot air is discharged outwards.

In addition, the hot air supply unit 130 may include dampers 137 provided within ducts 115 communicating with the interior of the accommodation space S of the body 110, such that each of the dampers 137 is operated by an actuator (not shown). Thus, the hot air supply unit 130 may adjust the amount of the hot air supplied into the accommodation space S using the damper 137 (see FIG. 3).

The temperature measuring unit 140 serves to measure the internal temperature of the accommodation space S.

Specifically, the temperature measuring unit 140 may include a first sensor 141 measuring the temperature of the hot air supplied by the hot air supply unit 130, a second sensor 143 monitoring the internal temperature of the accommodation space S in real time, and a third sensor 145 measuring the temperature of air discharged from the accommodation space S (see FIG. 2).

In this case, the third sensor 145, from among the plurality of sensors 141, 143, and 145 of the temperature measuring unit 140, may measure whether or not the internal temperature of the accommodation space S is a predetermined reference value.

The moisture supply unit 150 serves to supply moisture into the accommodation space S before the electrode E to be dried passes through the accommodation space S. The moisture supply unit 150 lowers the internal temperature of the accommodation space S is lowered to the predetermined reference value and stabilizes the internal temperature using the evaporation heat of the supplied moisture.

Specifically, the moisture supply unit 150 may include moisture spray nozzles 151 disposed within the ducts 115 connected to the accommodation space S and supplying the moisture in the form of mist, so that the moisture is contained in and supplied together with the hot air supplied into the accommodation space S (see FIG. 3).

In this case, a drain hole 117 may be provided in the bottom of the duct 115 such that water may be discharged outwards through the drain hole 117 when the water leaks from the moisture supply unit 150.

Referring to FIG. 4, the moisture supply unit 150 may include a storage tank 153 in which ultrapure water (or deionized (DI) water) is stored and a supply pump 155 supplying the ultrapure water stored in the storage tank 153 to the moisture spray nozzles 151 through a supply line 157.

The electrode drying apparatus 1 having the above-described configuration may be provided as a plurality of electrode drying apparatuses spaced apart from each other in parallel, and the ultrapure water stored in the storage tank 153 may be supplied to the plurality of electrode drying apparatuses 1 through the supply line 157.

In addition, an on-off valve 158 and a flow meter 159 may be disposed on the supply line 157 connected to the electrode drying apparatus 1. The on-off valve 158 and the flow meter 159 may monitor and control, in real time, a total amount of the ultrapure water supplied to the electrode drying apparatus 1.

The controller may control the overall elements 120, 130, 140, and 150 disposed in the body 110.

Specifically, the controller measures the internal temperature of the accommodation space S before the electrode E to be dried is introduced into the accommodation space S of the electrode drying apparatus 1, and then, determines whether or not the measured internal temperature of the accommodation space S is a level at which the drying of the electrode E to be dried is stabilized.

In this case, when the measured internal temperature of the accommodation space S is equal to or higher than the reference value, the moisture supply unit 150 sprays moisture into the accommodation space to cool the accommodation space.

Accordingly, the level at which the drying of the electrode E to be dried is stabilized may be maintained, thereby preventing the electrode E to be dried from being peeled or cracked by over-drying of the electrode at the early stage of the drying process.

In addition, an electrode drying process using the electrode drying apparatus according to the present invention having the above-described configuration will be described by referring to FIGS. 1 to 3 again.

First, before the electrode E to be dried is introduced into the accommodation space S of the electrode drying apparatus 1, the third sensor 145 of the temperature measuring unit 140 measures the internal temperature of the accommodation space S.

When the internal temperature of the accommodation space S measured by the third sensor 145 is equal to or higher than the reference value, i.e. the level at which the drying of the electrode E to be dried is stabilized, the moisture supply unit 150 sprays the moisture into the accommodation space S so as to cool the accommodation space. The moisture supply unit 150 allows the moisture to be contained in and supplied together with the hot air supplied into the accommodation space S.

In addition, the controller determines whether or not the internal temperature of the accommodation space S has reached the reference value by the evaporation heat of the moisture supplied into the accommodation space S. In this case, the controller adjusts the amount of moisture sprayed by the moisture supply unit 150 by comparing the measured temperature of air discharged through the accommodation space S with the reference value.

When the internal temperature of the accommodation space S has reached the reference value, the supply of the moisture into the accommodation space S is stopped, and then, the drying process is performed by allowing the electrode E to be dried to pass through the accommodation space S.

Although exemplary embodiments of the disclosure have been disclosed for illustrative purposes, those skilled in the art will appreciate that the present invention is not limited to the foregoing embodiments and various changes and modifications are possible, without departing from the technical spirit of the disclosure.

The invention claimed is:

1. An electrode drying apparatus comprising:
a body comprising:
an internal accommodation space provided for a drying process;
an inlet; and
an outlet;
a transporter configured to transport an electrode to be dried in a single direction so that the electrode to be dried passes through the accommodation space through the inlet and the outlet;
a hot air supplier configured to blow hot air toward the electrode transported by the transporter so as to dry the electrode to be dried;
a temperature measurer configured to measure an internal temperature of the accommodation space; and
a moisture supply unit configured to supply moisture into the accommodation space before the electrode to be dried passes through the accommodation space, so that the internal temperature of the accommodation space is lowered to a predetermined reference value, by evaporation of the supplied moisture, and is stabilized,
wherein the moisture supply unit comprises a moisture spray nozzle configured to supply the moisture in form of a mist so that the moisture is contained in and supplied together with the hot air supplied into the accommodation space by the hot air supplier,
wherein the moisture supply unit is configured to stop supplying moisture into the accommodation space once the predetermined reference value is reached, and
wherein, once the accommodation space reaches the predetermined reference value, the transporter is configured to start transporting the electrode to be dried into the accommodation space through the inlet.

2. The electrode drying apparatus of claim 1, wherein the hot air supplier comprises:
a heat exchanger configured to heat external air supplied thereto; and
a blower fan configured to supply the external air heated by the heat exchanger into the accommodation space.

3. The electrode drying apparatus of claim 2, wherein the hot air supplier further comprises a damper disposed within a duct that communicates with an interior of the accommodation space and configured to adjust an amount of the hot air supplied into the accommodation space.

4. The electrode drying apparatus of claim 3, wherein the moisture spray nozzle is disposed within the duct.

5. The electrode drying apparatus of claim 4, wherein a bottom of the duct includes a drain hole, the drain hole being configured to discharge water outwards when the water leaks from the moisture supply unit.

6. The electrode drying apparatus of claim 4, wherein the moisture supply unit further comprises:
a storage tank configured to store deionized (DI) water;
a supply line; and
a supply pump configured to supply the DI water stored in the storage tank to the moisture spray nozzle through the supply line.

7. The electrode drying apparatus of claim 6, wherein an on-off valve and a flow meter are disposed on the supply line connected to the electrode drying apparatus, and are controlled in real time, such that a total amount of the DI water supplied to the electrode drying apparatus using the on-off valve and the flow mater is controlled in real time.

8. An assembly including a plurality of the electrode drying apparatus of claim 1, the plurality of electrode drying apparatuses being spaced apart from each other in parallel,
wherein the plurality of electrode drying apparatuses include:
a storage tank configured to store deionized (DI) water; and
a supply pump configured to supply the DI water stored in the storage tank to the moisture spray nozzle through a supply line, and
wherein the DI water stored in the storage tank is supplied to each of the plurality of electrode drying apparatuses through the supply line.

9. The electrode drying apparatus of claim 1, wherein the temperature measurer comprises:
a first sensor configured to measure a temperature of the hot air supplied by the hot air supplier;
a second sensor configured to monitor the internal temperature of the accommodation space in real time; and
a third sensor configured to measure a temperature of air discharged from the accommodation space.

10. The electrode drying apparatus of claim 9, wherein, when the temperature measured by the third sensor is higher than the predetermined reference value, the moisture supply unit supplies the moisture into the accommodation space so that the internal temperature of the accommodation space reaches the predetermined reference value.

11. The electrode drying apparatus of claim 9, wherein the first sensor is located upstream of the moisture spray nozzle.

12. The electrode drying apparatus of claim 9, wherein the first sensor and the third sensor are located outside of the body.

13. An electrode drying method using the electrode drying apparatus according to claim 1, comprising:
measuring the internal temperature of the accommodation space before introducing the electrode to be dried into the accommodation space of the electrode drying apparatus;
when the measured internal temperature of the accommodation space is higher than the predetermined reference value, which is a level at which drying of the electrode to be dried is stabilized, spraying, by the moisture supply unit, moisture into the accommodation space to cool the accommodation space; and
when the measured internal temperature of the accommodation space has reached the predetermined reference value, stopping the supplying of the moisture into the accommodation space and performing a drying process by allowing the electrode to be dried to move through the accommodation space.

14. The electrode drying method of claim 13, wherein the moisture supply unit allows the moisture to be contained in and supplied together with the hot air supplied into the accommodation space.

15. The electrode drying method of claim 13, wherein an amount of the moisture sprayed by the moisture supply unit is adjusted by comparing a measured temperature of air discharged through the accommodation space with the predetermined reference value.

16. The electrode drying apparatus of claim 1, wherein the hot air supplier comprises:
   an upper trunk including discharge holes located on a bottom surface of the upper trunk; and
   a lower trunk including discharge holes located on an upper surface of the lower trunk,
   wherein the transporter is configured to move the electrode to be dried between the upper trunk and the lower trunk.

\* \* \* \* \*